C. S. LOCKWOOD.
CASING LOCK FOR ROLLER BEARINGS.
APPLICATION FILED SEPT. 6, 1912.
1,057,861. Patented Apr. 1, 1913.
2 SHEETS—SHEET 1.
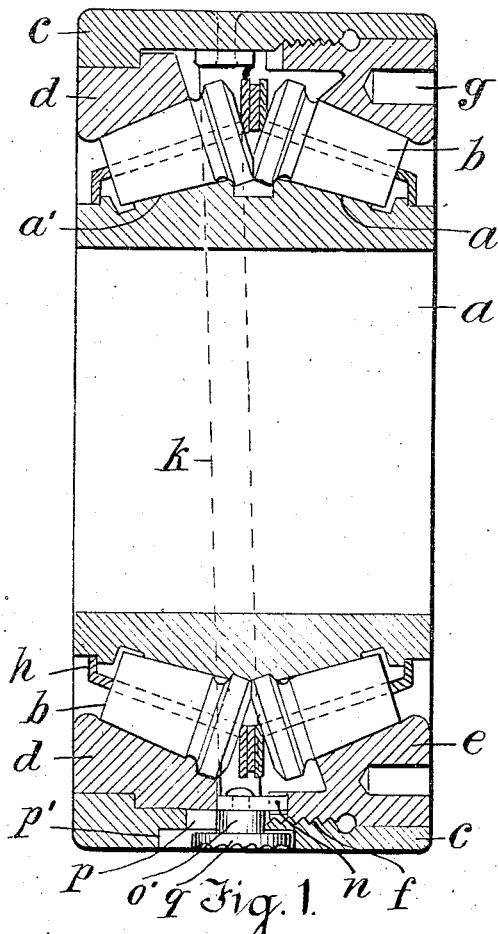
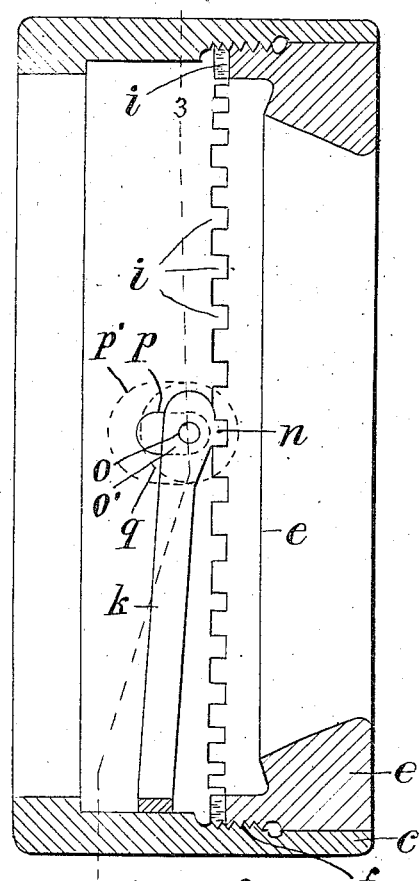
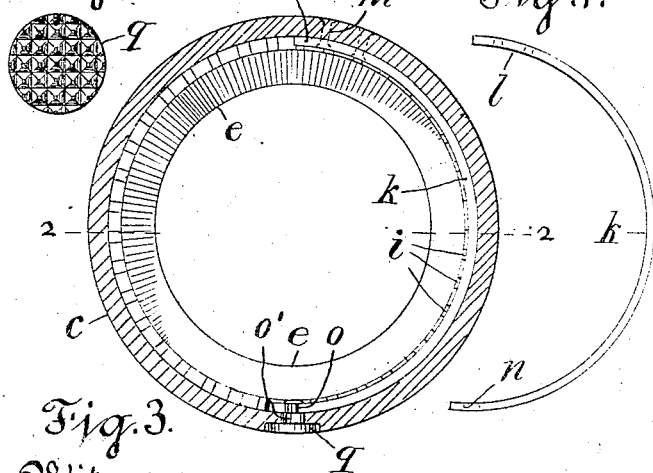
Witnesses
Inventor
Charles S. Lockwood,
per Thomas S. Crane, Atty.

C. S. LOCKWOOD.
CASING LOCK FOR ROLLER BEARINGS.
APPLICATION FILED SEPT. 6, 1912.
1,057,861.
Patented Apr. 1, 1913.
2 SHEETS—SHEET 2.
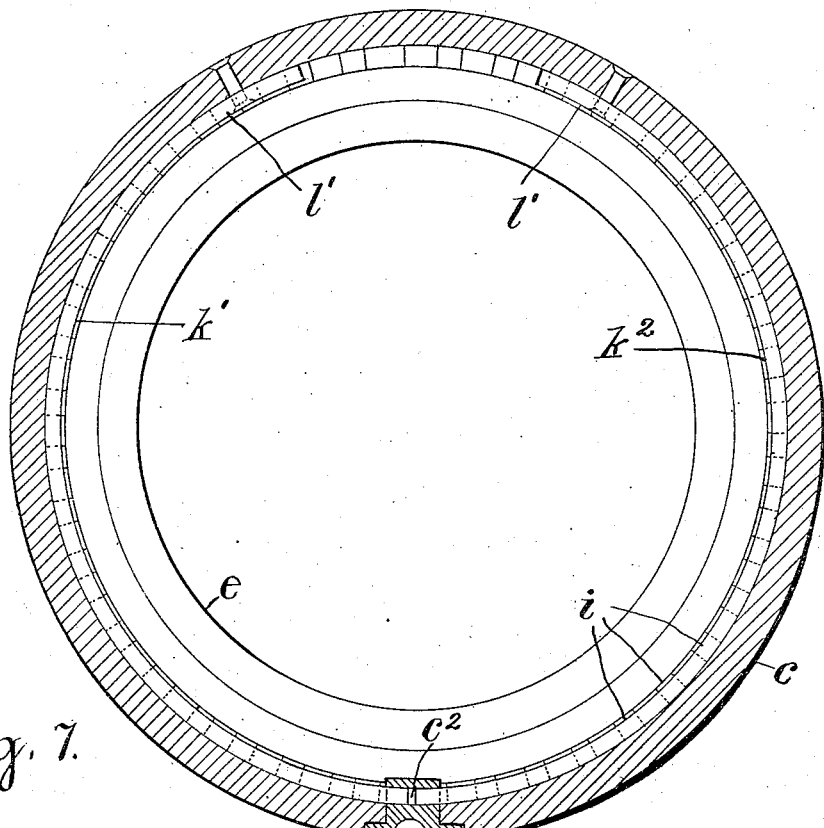
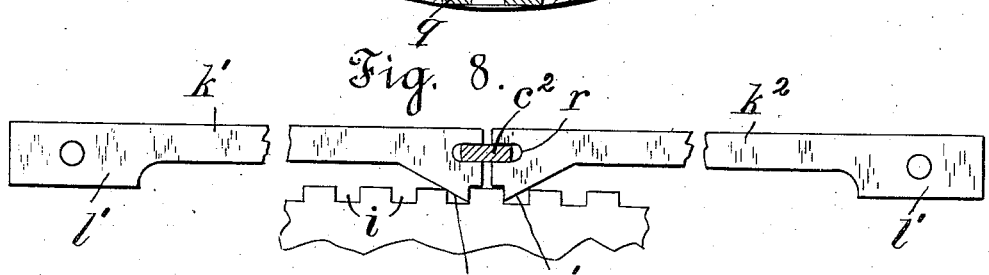
Witnesses:
L. Lee.
J. Walter Greenbaum.
Inventor
Charles S. Lockwood, pr
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, A CORPORATION OF NEW JERSEY.

CASING-LOCK FOR ROLLER-BEARINGS.

1,057,861.     Specification of Letters Patent.     Patented Apr. 1, 1913.

Application filed September 6, 1912. Serial No. 718,841.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Casing-Locks for Roller-Bearings, fully described and represented in the following specification and the accompanying drawings, forming a part of the same.

This invention relates to that class of roller-bearings in which a hub is provided with seats for two sets of tapering rolls and the casing is provided with two seats to engage the outer sides of the rolls, and one of such seats is adjustable to and from the other to fit the same accurately to the outer circumference of the rolls.

It is common in such casings to fix one seat rigidly within one end of the casing and to make the other adjustable by screwing it into the opposite end of the casing, and the object of the present invention is to furnish an efficient and economical means of locking the said movable seat in position when adjusted. In the present invention, this is effected by providing the inner edge of the adjustable seat with a continuous series or rack of teeth and intermediate notches, and providing the interior of the casing with a flexible bar-spring having a tongue to engage such notches, and a stud extended therefrom to the exterior of the casing for retracting the tongue from the notches when desired.

The casing is constructed with an annular space between the stationary and movable seats, and the spring is preferably made of a flat bar extended half way around the interior of this space and having one end secured to the casing by two rivets, with the tongue upon the opposite end extended into the notches of the adjustable seat. A slot is formed in the casing transverse to the spring adjacent to the tongue, and a stud is projected from the tongue through the slot so as to be readily manipulated by the fingers from the outside of the casing.

The outer end of the stud is not constructed to project beyond the periphery of the casing, and the invention is thus applicable to that class of self-contained roller-bearings which have a cylindrical exterior adapted to fit in a socket in any part of an automobile or other mechanism, as there is no projection upon its exterior to interfere with its fitting into such a socket. If preferred, two springs may be used extended within the casing in opposite directions and embracing opposite sides of the rack-teeth between the rack-notches. This construction resists any movement of the adjustable seat more rigidly, as the curved spring resists rigidly any pressure directed toward its foot, but not in the other direction which tends to straighten the spring and loosen it from the interior of the casing. Where a single spring is used, the stud must fit the casing-slot snugly so that the stud may resist circumferential pressure; but where two springs are used the thrust of the adjustable seat upon each spring is toward the foot of the spring, and the teeth upon the seat are held rigidly regardless of the stud. Where a single spring is used a certain movement of the rack-teeth would extend the spring and tend to draw it from its seat, and thus permit some motion of the ring *e*, but where two springs are used one or the other operates positively to hold the ring *e* rigidly.

Both forms of the invention are shown in the annexed drawing, in which—

Figure 1 is a longitudinal section of a bearing containing the improvement. The parts where hatched are in section at the center line of the bearing. Fig. 2 is a longitudinal section of the casing on line 2—2 in Fig. 3; Fig. 3 is a transverse section of the casing on line 3—3 in Fig. 2; Fig. 4 is an edge view of the bar-spring; Fig. 5 shows the exterior of the casing where the slot and stud are located; and Fig. 6 shows the outer side of the button for moving the stud. Figs. 3, 4 and 5 are upon a smaller scale than the other figures. Fig. 7 is a view like Fig. 3 upon a larger scale, showing two springs applied to the casing; Fig. 8 is a view of the two spring blanks with their tongues in working relation to one another and the springs broken for want of room upon the drawing; Fig. 9 is an edge view, and Fig. 10 the inner end of a stud adapted for use with two springs.

In Figs. 1 to 6, *a* designates the hub of the bearing carrying tapering roll-seats *a'* with tapering rolls *b* fitted thereto. *c* designates the shell of the casing having a stationary seat *d* fitted within one end and a seat *e* fitted movably within the other end by means of a screw-thread $f$. The seats $d$ and $e$ are of collar form, and the seat $e$ is provided with holes $g$ upon its outer side to which a spanner may be applied for turning the seat in the casing. Such turning approximates the seats $d$ and $e$ toward one another, thus enabling them to fit all the moving parts to one another without lost motion, and also to compensate for wear when it occurs. The usual cage $h$ is shown for holding the rolls in position during their rotation on the hub. The inner end of the seat or ring $e$ is shown provided with a series or rack of teeth and rectangular notches $i$, and in the space between such notches and the inner end of the seat $d$ a curved bar-spring $k$ is located and has its foot $l$ secured to the casing by rivets $m$. Such bar-spring it fitted to the interior of the casing between the seats $d$ and $e$ and is shown in Fig. 3 extending half way around the same, and it is provided, as shown in Fig. 2, with a square tongue $n$ to fit the notches $i$, and thus resist motion of the seat $e$ in either direction. The head of the spring adjacent to the tongue $n$ is perforated to receive a stud $o$ which has a shank $o'$ extending outward through a casing-slot $p$ in the casing. A recess $p'$ is formed in the periphery of the casing around the slot to receive a button $q$ attached to the shank of the stud, such button being roughened as shown in Figs. 1 and 6 to be readily grasped by the finger, and sunk in the recess so as not to project beyond the periphery of the casing. The extension of the spring around the inner half of the casing gives it flexibility to yield when the button or stud is pushed laterally by the finger, while the fitting of the shank or stud to the slot holds the tongue from movement circumferentially when the tongue is engaged with the notches of the seat, as shown in Fig. 2. When it is desired to adjust the movable seat $e$, the button $q$ is pushed backwardly in the recess $p'$, thus retracting the tongue $n$ from the notches $i$ and permitting the seat to be turned freely within the casing. When the desired adjustment is effected, the button is released and the tongue is engaged with the nearest notch $i$. The notches are so numerous in the seat that an almost infinitesimal adjustment can be effected and the nearest notch turned to engage the tongue without impairing the adjustment required.

Fig. 7 shows two springs $k'$ and $k^2$ having their heads each overlapping half the width of the transverse casing-slot $p$, and provided with similar coinciding slots $r$ to both of which the shank $c^2$ of the stud is fitted, by flattening the same, as shown in Figs. 9 and 10. The bars of the two springs extend in opposite directions from the stud nearly half way around the casing, with their feet $l'$ riveted thereto. The heads of these two springs are not constructed with a rectangular tongue to fit both sides of the notches $i$ of the adjustable seat, but are formed each with a tongue $n'$ sloped toward the end of the spring-bar and adapted to engage opposite sides of the teeth which lie between the notches $i$. Any tendency of the seat to rotate in either direction thus produces compression upon the bar of one or the other spring by longitudinal pressure, and no movement has any tendency to extend the spring or draw it from contact with the interior of the casing, as the tongue upon each spring holds the adjustable seat positively and rigidly from rotation in one direction. When a single spring is employed, the stud is preferably riveted thereto, as shown in Fig. 1, but it may be operated by fitting the flattened shank of a stud to a slot in its head in the manner shown in Fig. 8. It is obvious that where the stud is fitted to an open slot in the head of the spring, as in Fig. 8, the stud has no restraining influence upon the end-movement of the tongue, for which reason when a single spring is used and the tongue required to resist motion in both directions, it is preferable that the stud should be secured rigidly to the head of the spring and fitted snugly to the casing-slot, thus preventing any circumferential movement of the tongue. The cross-section of the bar-spring is immaterial provided it has a body of sufficient stiffness and length sufficiently great to give to it the flexibility desired.

I am aware that it is common where circular parts are movable upon one another to provide the parts respectively with ratchet-teeth and a spring-pawl of some kind; but my construction differs from these in the projection of a stud from the head of the spring through a slot in the casing, and flush with the exterior of the same so as not to project therefrom. This construction permits the spring to be moved and the parts of the bearing adjusted by merely manipulating the stud and turning the ring $e$. My invention also differs in other constructive features which make the locking-device more effective.

Having thus set forth the nature of the invention what is claimed herein is:

1. In a roller bearing, the combination, with a casing having roll-seats in opposite ends, one of such seats being rotatable for adjustment and having a continuous series of notches upon its inner edge, of a flexible bar-spring curved to fit the interior of the casing and having one end attached rigidly thereto, the opposite end provided with a lateral tongue pressed normally by the spring toward the notches, the casing having a transverse slot in its periphery, and a stud projected from the spring through the slot to retract the spring from the notches when desired.

2. In a roller bearing, the combination, with a casing having roll-seats in opposite ends, one of such seats being rotatable for adjustment and having a continuous series of rectangular notches upon its inner edge, of a flexible bar-spring fitted to the interior of the casing and having one end secured rigidly thereto, and the opposite end provided with a lateral tongue pressed normally by the spring toward the notches, the casing having a transverse slot extended through the casing adjacent to the free end of the spring with an oblong recess at the outer side of such slot, and a stud attached to the free end of the spring and extending through the slot and provided upon its outer end with a button inclosed in the said recess.

3. In a roller bearing, the combination, with a casing having roll-seats in opposite ends, one of such seats being rotatable for adjustment and having a continuous series of notches upon its inner edge, of a flexible bar-spring arranged within the casing between the seats and having one end attached rigidly to the casing and the opposite end provided with a tongue to engage the notches, the casing having a transverse slot adjacent to the tongue, and a stud projected through the slot from the spring for moving the tongue by the finger, and the engagement of the stud with the slot serving to resist any circumferential pressure upon the tongue.

4. In a roller bearing, the combination, with the cylindrical shell $c$, of the separate roll-seat $d$ fitted stationary within one end, and the annular seat $e$ screwed into the opposite end and provided upon its inner edge with a continuous series or rack of teeth, a flexible bar-spring arranged within the casing between the two seats and having one end rigidly attached to the casing and the opposite end provided with a tongue to engage the notches, the casing having a transverse slot adjacent to the free end of the spring with an oblong recess at the outer end of such slot, and a stud attached to the free end of the spring and extending through the slot and provided upon its outer end with a button sunk in the said recess, whereby the spring may be operated without any projection beyond the cylindrical periphery of the shell.

5. In a roller bearing, the combination, with a casing having roll-seats in opposite ends, one of such seats being rotatable for adjustment and having a continuous rack of notches and teeth upon its inner edge and the casing having a casing-slot transverse to its ends, of two flexible bar-springs fitted to the interior of the casing and having feet secured thereto and heads arranged adjacent to the said slot and slotted coincident therewith, the heads having tongues fitted respectively to the notches at opposite sides of the rack-teeth, and a stud being extended through the casing-slot and having a flattened shank fitted to the slotted spring-heads to draw the tongues simultaneously from the rack spaces.

In testimony whereof I have hereunto set my hand in the presence of two subscribing witnesses.

CHARLES S. LOCKWOOD.

Witnesses:
G. C. STULTS,
E. I. WILLIAMS.